United States Patent
Wrinkle et al.

(10) Patent No.: US 7,789,428 B2
(45) Date of Patent: Sep. 7, 2010

(54) π SHAPED CROSS-MEMBER

(75) Inventors: Timothy Wrinkle, Greensboro, NC (US); Arthur Fowler, Winston-Salem, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 223 days.

(21) Appl. No.: 12/086,073

(22) PCT Filed: Dec. 23, 2005

(86) PCT No.: PCT/US2005/046647

§ 371 (c)(1),
(2), (4) Date: Jun. 5, 2008

(87) PCT Pub. No.: WO2007/073377

PCT Pub. Date: Jun. 28, 2007

(65) Prior Publication Data

US 2009/0039633 A1    Feb. 12, 2009

(51) Int. Cl.
*B62D 21/12* (2006.01)
(52) U.S. Cl. ..................... 280/785
(58) Field of Classification Search ............ 280/781, 280/785, 789, 797, 798, 799; 296/30, 204; 29/897.2, 897.35
See application file for complete search history.

(56) References Cited

U.S. PATENT DOCUMENTS

| | | | |
|---|---|---|---|
| 3,476,405 A * | 11/1969 | Cunha | 280/476.1 |
| 3,580,611 A * | 5/1971 | McNitt | 280/433 |
| 3,735,998 A | 5/1973 | Green | |
| 4,787,669 A | 11/1988 | Wante | |
| 5,562,179 A | 10/1996 | McAdam | |
| 5,655,792 A | 8/1997 | Booher | |
| 5,725,247 A * | 3/1998 | Nilsson et al. | 280/781 |
| 6,398,260 B1 | 6/2002 | Rinehart | |
| 6,398,261 B1 | 6/2002 | Ammer et al. | |

\* cited by examiner

*Primary Examiner*—Faye M. Fleming
(74) *Attorney, Agent, or Firm*—Martin Farrell; Michael Pruden

(57) ABSTRACT

A cross-member for supporting a vehicle chassis loads includes a generally shaped member including: i) a generally flat top sheet; ii) a first side sheet extending at an angle from the top sheet, along a length of the top sheet at a location inset from a first side edge of the top sheet such that the top sheet overhangs the first side sheet; iii) a second side sheet extending at an angle from the top sheet, along a length of the top sheet at a location inset from a second side edge of the top sheet such that the top sheet overhangs the second side sheet.

14 Claims, 4 Drawing Sheets

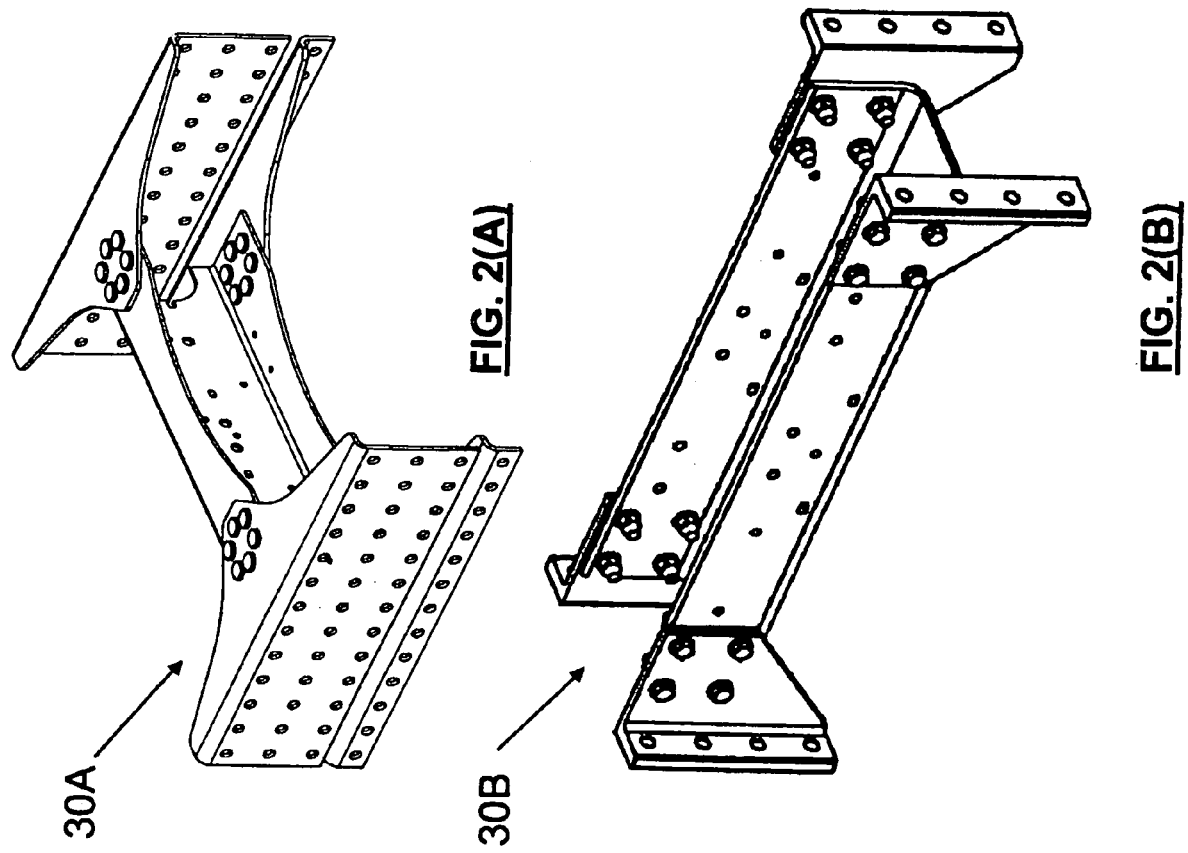

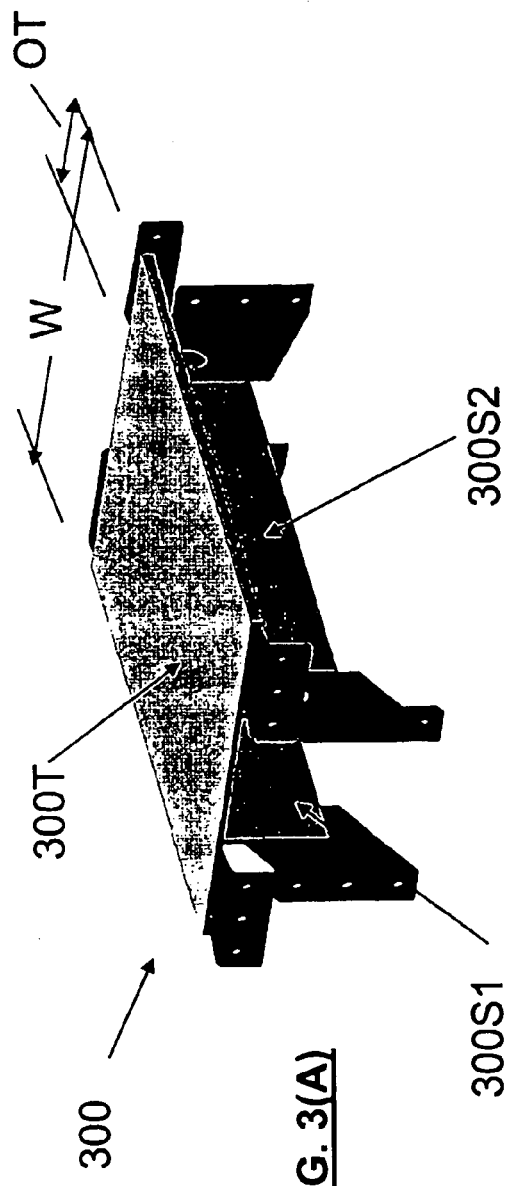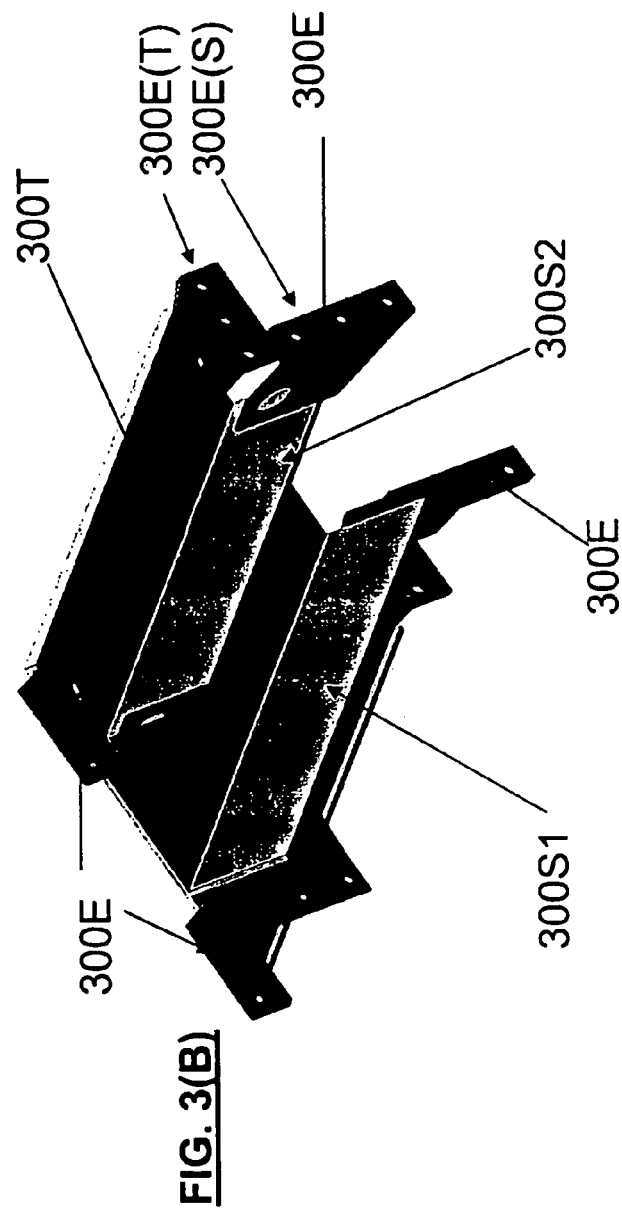
FIG. 3(A)
FIG. 3(B)

π SHAPED CROSS-MEMBER

The present invention relates to, among other things, cross-members for vehicle frames and the like, and the preferred embodiments relate to systems and methods for a vehicle chassis, frame and/or the like.

BACKGROUND

Cross-members can be used as supporting members for vehicle chassis loads, as components of frames and/or the like. By way of example, as shown in FIG. 1, in some trucks and commercial vehicles, a typical chassis structure 10 includes two elongated lengthwise extending frame members 20A and 20B connected by a plurality of cross-members 30.

With reference to illustrative example shown in FIG. 1, the frame members 20A and 20B are adapted to be employed on a truck with the cross-members 30 positioned at various locations proximate to the labeled portions of the truck—e.g., the front closing portion, the engine portion, the transmission portion, the bogie portion, the rear closing portion, etc. For reference, the term "chassis" includes, but is not limited to, a frame for use with and as a support or undercarriage for a container.

A conventional cross-member configuration is shown in FIG. 2 (A). This conventional shape of a cross-member has proven to be generally proficient at carrying loads under circumstances such as frame parallelogramming, frame roll, and frame twist. Among other things, a significant disadvantage of this conventional style of cross-member is the amount of material required to fabricate the cross-member. Most notably, with this conventional type cross-member configuration, weight is a problem.

In truck and commercial vehicle industries, weight is a significant factor to be considered. Other cross-member shapes have been developed in an effort to minimize or reduce vehicle weight. However, such efforts have had limitations. In some examples, to offer some weight relief, an aluminium front-of-bogie member has been provided, such as, e.g., shown in FIG. 2 (B). This shape cross-member is generally efficient at carrying frame-roll loads, but it has some limitations and is inferior to a conventionally shaped cross-member in frame parallelogramming and in frame twist load cases. Due to these deficiencies, the use of this type of cross-member has been limited.

As set forth below, the preferred embodiments of the present invention provide notable advancements over the above and other existing systems and devices.

SUMMARY

The preferred embodiments of the invention greatly improve upon existing systems and methods.

According to the invention, a cross-member for a vehicle frame includes a generally flat top sheet member and at least one side sheet member depending at an angle from the top sheet member. The cross-member is mounted to the spaced, parallel frame rails of vehicle frame with the top sheet member or top sheet in a horizontal orientation extending laterally between the frame rail with the at least one side sheet member vertically oriented and extending laterally between the frame rail members.

According to a preferred embodiment of the invention, a vehicle chassis is provided that includes: a) two generally parallel frame members; b) a generally π-shaped member mounted between the two frame members with ends of the generally or π-shaped member fixed to the frame members; c) the generally π-shaped member including: i) a generally flat top sheet; ii) a first side sheet extending at an angle from the top sheet; and, iii) a second side sheet extending at an angle from the top sheet and spaced from the first side sheet.

By "sheet" is meant a sheet-like member, that is, a member having a thickness that is small in comparison to its length and width dimensions.

According to an aspect of the invention, the at least one side sheet may be positioned on the top sheet in any convenient or advantageous location, as will be further described below. In the embodiment having a first side sheet and second side sheet, the side sheets may be positioned spaced from a lateral edge of the top sheet with a portion of the top sheet overhanging the side sheets.

According to yet some other examples, a method for assembling a vehicle chassis includes: mounting a generally π-shaped cross-member between two frame members of a vehicle chassis with ends of the generally π-shaped cross-member fixed to the frame members.

In some examples, the vehicle chassis is a truck chassis, and the cross-member of the invention is a bogie cross-member for a truck. In some other examples, the two frame members extend generally in a front-to-back direction of the vehicle and the cross-member extends laterally across the vehicle. In some other examples, the cross-member is an extruded member having a substantially constant cross-section. In yet some other examples, the generally π-shaped member includes a plurality of end plates fixed to the generally π-shaped member and to respective ones of the frame members.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which like reference numerals indicate like or similar parts, and in which:

FIG. 2(A) is a first illustrative background cross-member that the preferred embodiments disclosed herein improve upon;

FIG. 2(B) is a second illustrative background cross-member that the preferred embodiments disclosed herein improve upon;

DETAILED DESCRIPTION

Figure 1:
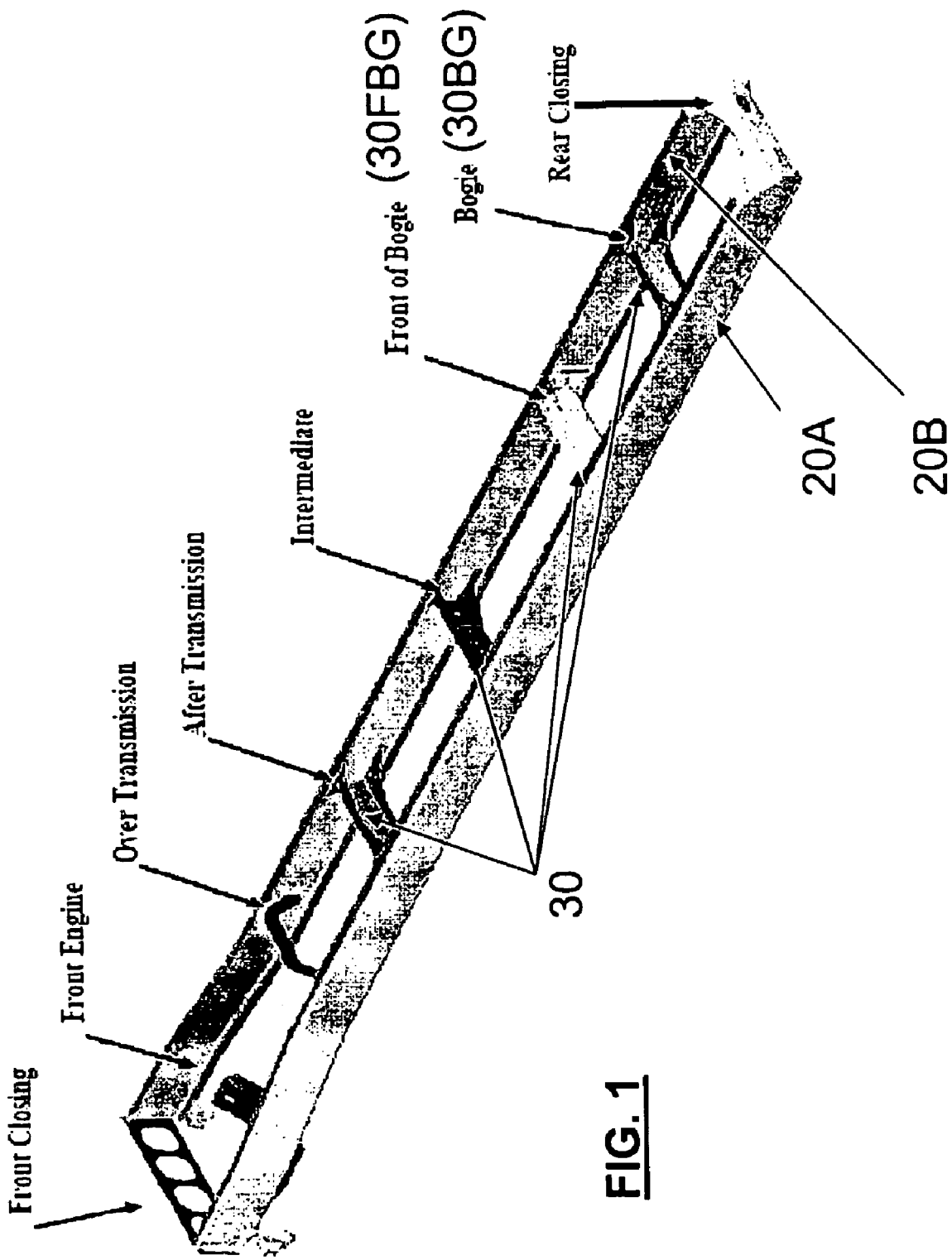
FIG. 1 is a top perspective view of a frame and cross-member chassis structure for a vehicle according to some illustrative examples.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

According to the preferred embodiments, a new cross-member concept is provided which can provide substantial advantages over existing cross-members. Among other applications, the preferred cross-members of the present invention can have substantial advantages and benefits in the environments of trucks and/or commercial vehicles, and especially in chassis frame structure applications.

According to exemplary embodiments, the cross-member 300 has a generally T-shaped or π-shaped configuration. For example, the embodiments shown in FIGS. 3(A) and 3(B) show the cross-member with a top sheet 300T and two downwardly depending legs or sheets 300S1 and 300S2 to form a π-shaped configuration. As will be readily understood by those skilled in the art, a T-shaped cross-member would be formed by having a single downwardly depending sheet.

Among other things, a cross-member in accordance with the invention, either a substantially T-shaped or substantially π-shaped configuration can provide a high level of rigidity under a variety of conditions, such as, e.g., under a) frame parallelogramming conditions, b) frame roll conditions, and/or c) frame twist load conditions. The top sheet member provides resistance to frame parallelogramming. The one or more side sheet members provide stiffness to the top sheet, and may provide lateral stiffness to the vehicle frame. As a result, a cross-member in accordance with the invention has certain advantages of the conventional design shown in FIG. 2(A). In addition, the cross-member configuration also offers substantial other advantages, including considerable weight reduction. In this regard, in vehicle industries and, especially, in commercial vehicle industries, there is a substantial need to minimize or reduce the weight of vehicle components, without jeopardizing and/or compromising vehicle component qualities.

The cross-member in accordance with the invention will be more fully described below in conjunction with a preferred embodiment having a substantially π-shaped configuration, however, this is for the convenience of the description and is not meant to exclude a T-shaped configuration or a configuration having more than two side sheets.

As shown in FIGS. 3(A) and 3(B), a preferred embodiment of the invention takes the form of a π-shaped cross-member and includes a top sheet 300T and two depending side sheets 300S1 and 300S2 that extend from the top sheet 300T. In one embodiment particularly suitable for use as a bogie cross-member, and referring also now to FIG. 3(B), the top sheet 300T may extend laterally outward so as to overhang both of the side sheets 300S1 and 300S2 a distance OT. This positions the side sheets to span between the spring hanger brackets of the suspension to provide lateral support to the frame. The side sheets may alternatively be located at any convenient or advantageous position relative to the top sheet.

In some embodiments, the π-shaped cross-member 300 can have a cross-sectional shape that is substantially similar to that shown. In this regard, FIGS. 3(A) to 3(B) show some illustrative examples, with the figures being to scale in some illustrative and non-limiting examples. In some preferred embodiments, the top sheet 300T can be substantially flat and planar. Similarly, in some preferred embodiments, as shown, the side sheets 300S1 and/or 300S2 can be substantially flat and planar. In addition, in some preferred embodiments, the top sheet 300T is oriented at a 90 degree or right angle to the side sheets 300S1 and/or 300S2. It should be understood based on this disclosure, however, that the sizes, angles and configuration can be varied widely based on circumstances. For example, the wide dimension W should be a large as practical to provide resistance to parallelogramming. Although some specific examples are provided, the present invention is not limited to any of these illustrative examples, but encompasses a wide extent of variation.

Among other things, in the preferred embodiments as mentioned, the flat top sheet 300T of the π-shaped configuration can contribute largely to stiffness under parallelogramming conditions, whereas previous U-shape cross-member designs had substantial deficiencies and were significantly lacking.

According to some preferred embodiments, the π-shaped cross-member 300 can be readily formed by extrusion processes in which, e.g., an aluminum or other metal is melted and formed into a long, substantially-continuous cross-sectional shape via an extrusion die opening (such as, e.g., so that the π-shaped cross-member is formed as an unitary integrally extruded single piece).

As shown in FIGS. 3(A) and 3(B), in examples where the π-shaped cross-member 300 is formed via an extrusion process, additional end pieces or tie plates 300E can be employed to facilitate mounting of the cross-member to the frame rails (20A and 20B in FIG. 1). While these end pieces are discussed in the context of an extruded π-shaped cross-member, similar end pieces can be employed in any embodiment in which additional mounting pieces may be desired. In some embodiments, such as, e.g., in the illustrated embodiments, the end pieces 300E are substantially L-shaped so as to be readily attached to a planar surface of the frame rails 20A or 20B and to the top sheet 300T or the side sheets 300S1 or 300S2. In addition, as shown in FIG. 3(B), in some embodiments, individual end pieces 300E can be attached to the top sheet 300T and to the side sheets 300S1 and 300S2, such as, e.g., individual end plate 300E(T), attached to the top sheet 300T, and 300E(S), attached to the side sheet 300S2, in the depicted example. In some embodiments, the end plates 300E(T) and 300E(S) can each be formed as a single L-shaped bracket member. In the preferred embodiments, the end plates are, thus, configured so as to be fixedly mounted to a respective side sheet 300S1 or 300S2 and/or to a respective overhanging portion OT of the top sheet 300T. Among other things, this configuration can provide a rigid and reliable mounting structure.

In various embodiments, the end pieces 300E or tie plates can be attached to the π-shaped cross-member 300 using any appropriate means, such as, e.g., via welding, riveting and/or bolting the end plates to the cross-member 300. In some most preferred embodiments, the end pieces 300E are attached via bolts.

Figure 3C:
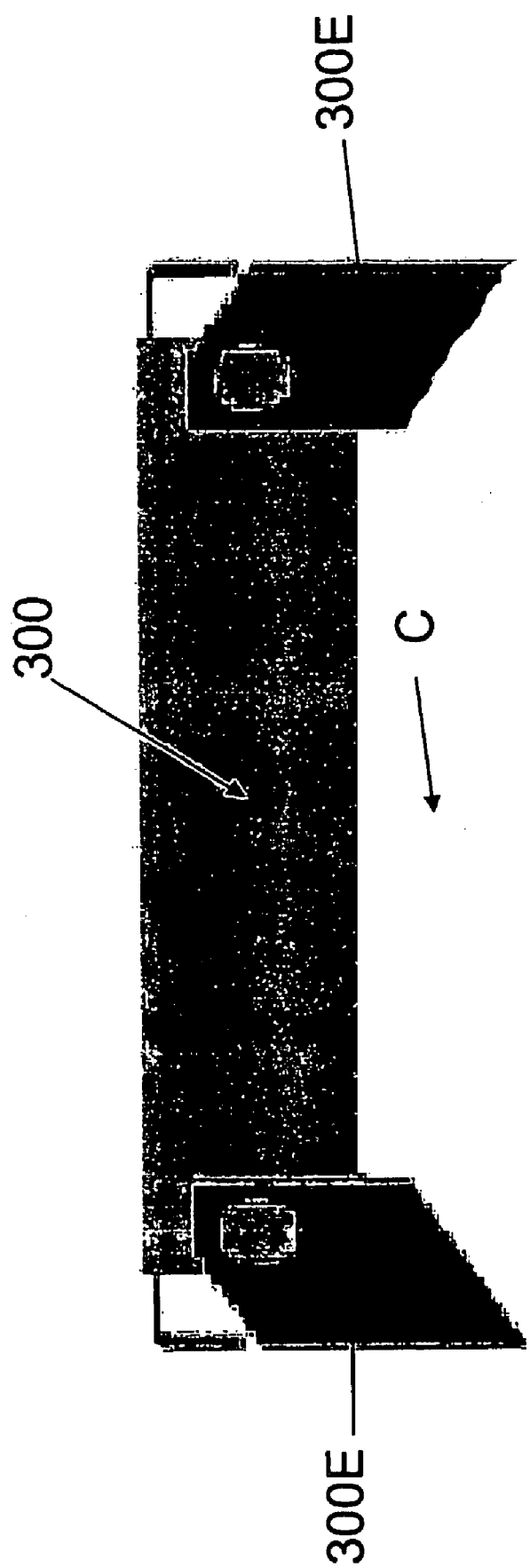
FIG. 3(A) is a top perspective view of an illustrative and non-limiting π-shaped cross-member according to some illustrative and non-limiting examples.
FIG. 3(B) is a bottom perspective view of the illustrative and non-limiting π-shaped cross-member shown in FIG. 3(A); and, FIG. 3(C) is a side view of an illustrative and non-limiting π-shaped cross-member similar to that shown in FIG. 3(A).

FIG. 3(C) is a side view of the cross-member shown in FIGS. 3(A) and 3(B). As illustrated in this figure, the cross-member 300 can readily allow for substantial axle and/or driveline clearance C between a bottom end of the end plate or tie 300E and the bottoms of the side sheets 300S1 and 300S2.

In some alternative embodiments, the π-shaped cross-member 300 can be formed using other methods, such as, e.g., by machining or cutting blocks of metal or steel, by molding, forging, by roll-forming and/or by otherwise constructing a π-shaped configuration with a metal and/or other appropriate material. In addition, in some embodiments the π-shaped cross-member 300 can be formed from a plurality of individual pieces that are fastened, welded, bolted and/or otherwise connected together to form the desired π-shaped configuration. In addition, while in some embodiments, the π-shaped cross-member 300 is formed so as to have end plates or ties 300E attached thereto, in some embodiments, end plates 300E and/or other elements can be integrally formed as a unitary part of the π-shaped cross-member 300 such as, e.g., by machining or cutting, molding and/or otherwise forming the components together using a process other than extrusion.

Some illustrative embodiments of the present invention have been studied and found to match or improve upon the conventional steel cross-members in, among other aspects, parallelogramming load cases. As should be appreciated based on the present disclosure, the generally π-shaped cross-members according to the various preferred embodiments can provide notable advantages over existing cross-members. Among other things, such a generally π-shaped cross-member 1) offers a new way to carry loads, 2) was not previously contemplated or appreciated in the context of a vehicle chassis, and 3) provides substantial weight reducing and other advantages over existing vehicle chassis cross-members on the market.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A vehicle chassis, comprising:
   a) two generally parallel frame members extending longitudinally from a front to a rear of the chassis;
   b) a cross-member mounted between said two frame members with ends of said cross-member fixed to said frame members;
   c) said cross-member including:
      i) a generally flat top sheet having a length perpendicular to the longitudinal direction of the chassis; and,
      ii) a first side sheet extending at an angle from said top sheet along a length of said top sheet, and a second side sheet extending at an angle from said top sheet along a length of said top sheet, the first side sheet and second side sheet being mutually spaced and being spaced from opposing side edges of the top sheet such that the top sheet overhangs the first side sheet and second side sheet; and,
   d) a plurality of brackets mounting the top sheet and the side sheets to each frame member.

2. The vehicle chassis of claim 1, wherein said vehicle chassis is a truck chassis.

3. The vehicle chassis of claim 1, wherein said cross-member is a bogie cross-member for a truck.

4. The vehicle chassis of claim 1, wherein said cross-member is an extruded member having a substantially constant cross-section.

5. The vehicle chassis of claim 3, wherein said cross-member includes a plurality of end plates fixed to the cross-member and to respective ones of said frame members.

6. A cross-member for a truck frame having frame rails defining a longitudinal direction, comprising:
   i) a generally flat top sheet;
   ii) at least one side sheet extending at an angle from said top sheet along a length of said top sheet perpendicular to the longitudinal direction of the truck frame, wherein said cross-member member is a bogie cross-member for a truck.

7. The vehicle chassis of claim 6, wherein the cross-member is generally π-shaped, having a first side sheet and a second side sheet.

8. The vehicle chassis of claim 7, wherein the first side sheet and second side sheet are at a location inset from opposing side edges of said top sheet such that said top sheet overhangs said first side sheet and second side sheet.

9. The cross-member of claim 6, wherein said cross-member is an extruded member having a substantially constant cross-section.

10. The cross-member of claim 6, wherein said cross-member further comprises end pieces configured to be attached to two generally parallel frame members.

11. The method for assembling a vehicle truck chassis, comprising:
   providing two substantially parallel frame rails,
   mounting a cross-member having a top sheet and at least one downwardly depending side sheet between the two frame members with ends of the top sheet and said at least one downwardly depending side sheet of said cross-member fixed to said frame members,
   wherein, the cross member is mounted at a bogie position of the chassis, the method further comprising providing a generally π-shaped cross-member comprising:
      i) a generally flat top sheet;
      ii) a first side sheet extending at an angle from said top sheet, along a length of said top sheet at a location inset from a first side edge of said top sheet such that said top sheet overhangs said first side sheet;
   iii) a second side sheet extending at an angle from said top sheet, along a length of said top sheet at a location inset from a second side edge of said top sheet such that said top sheet overhangs said second side sheet.

12. The method of claim 11, further including positioning the generally π-shaped cross-member relative to the frame rails so that the side sheets extend between and support locations for suspension spring hanger brackets.

13. The method of claim 11, further including attaching said cross-member to said frame members via a plurality of end plates.

14. The method of claim 13, further including attaching said cross-member to said frame members via said plurality of end plates, wherein said end plates are substantially L-shaped and have through-holes which receive locking bolts mounting said cross-member to said frame members.

\* \* \* \* \*